United States Patent [19]

Guzay et al.

[11] 4,333,633

[45] Jun. 8, 1982

[54] PNEUMATIC SENSOR

[75] Inventors: Casimir M. Guzay, Hoffman Estates; James A. Wright, Chicago, both of Ill.

[73] Assignee: Panduit Corp., Tinley Park, Ill.

[21] Appl. No.: 152,276

[22] Filed: May 22, 1980

[51] Int. Cl.³ .................................................. F16K 1/00

[52] U.S. Cl. .................................... 251/320; 251/339; 251/340

[58] Field of Search ................ 251/339, 320, 319, 340

[56] References Cited

U.S. PATENT DOCUMENTS 617,337 1/1899 Harrison ......................... 251/339 X 3,083,944 4/1963 Doeden ........................... 251/340 X

FOREIGN PATENT DOCUMENTS 432892 12/1974 U.S.S.R. .............................. 251/340

*Primary Examiner*—Arnold Rosenthal
*Attorney, Agent, or Firm*—Charles R. Wentzel; Richard B. Wakely

[57] ABSTRACT

A pneumatic sensor for connection to the sensor port of a bleed-pressure piloted valve and which is responsive to engagement by an article the presence of which is to be detected to block air from escaping said sensor port. The sensor includes a body having a bore and a target slightly smaller than the bore disposed in the bore and having an aperture the axis of which extends transversely to that of the bore. A tube connected to the sensing port and slightly smaller than the aperture extends through the body and into the aperture. The tube has an opening disposed in the aperture and extending generally toward the end of the target to be engaged by the article. The target is movable between an extended position and a retracted position in which the target blocks the opening, air pressure biasing the target to its extended position and the surface of the target defining the aperture being arcuate. When the target is in its extended position, air escaping from the tube opening undergoes annular flow causing a pressure balance on the surface defining the target opening so that the target is movable from its extended position by very low force.

3 Claims, 13 Drawing Figures

PNEUMATIC SENSOR

BACKGROUND OF THE INVENTION

The present invention relates to apparatus for crimping the ferrules of electrical terminals and more particularly to a portable pneumatically operated crimping press for crimping terminals carried by a tape.

Electrical terminals of the type having a ferrule or barrel from which extends a ring, fork, blade . . . etc. have been used in electrical wiring for many years. The ferrule is crimped about the stripped end of an insulated wire and initially plier-like hand tools were used for deforming the ferrule. This method of termination proved extremely time consuming, and, if the ferrule was misaligned with respect to the tool jaws, often yielded terminations which were unacceptable.

Crimping presses subsequently were offered which included a pair of die members relatively movable between an open position and a crimping position. These presses required the terminals to be loaded individually and the operator to hold a wire in the ferrule as operation of the press was initiated, for example, by actuation of a foot treadle. While such presses offered faster termination than hand tools, the manual loading of terminals, besides being tedious and a safety hazard to the operator, again often resulted in terminals misaligned with the die members and attendant unsatisfactory terminations.

To overcome these deficiencies, crimping presses were proposed for use with terminals carried on a tape or belt advanced by a sprocket wheel or the like to bring successive terminals into registration with the crimping dies after crimping of the downstream terminal had been completed and it had been removed from between the dies. One such press included a plurality of air cylinders for moving the die members from their crimping position to a full open position and thereafter to a clamping or holding position wherein the next terminal to be crimped was concurrently engaged by both die members prior to insertion of the wire. The inclusion of the clamping position in the cycle of operation offers a safety advantage because when the operator inserts the wire, the die members are sufficiently close together to prevent the operator inadvertently positioning a finger between them.

The air cylinders also function to advance the tape as the die members are moved from their full open position to their clamping position. This creates a race condition between the tape and the die members because if the die members reach their clamping position prior to completion of tape advance, the die members will interfere with the next terminal and prevent its moving into registration with the die pockets. This prior art press offers only a single tape advance length thus requiring the terminals carried by the tape to be on the same centers without regard to their size. Accordingly, a tape carrying small terminals will require relatively large spaces between adjacent terminals. Reference may be made to U.S. Pat. Nos. 3,037,545 and 3,423,815.

SUMMARY OF THE INVENTION

Among the several objects and features of the present invention may be noted the provision of an improved crimping press; the provision of such press which advances the terminal-carrying tape as the die members move from their crimping position to their full open position thus preventing the die members from interfering with advance of the tape; the provision of such a press which has variable tape feed length allowing tape carrying smaller terminals to have a higher carrying density; the provision of such a press which uses only a single pneumatic cylinder for movement of the die members and for tape advance; the provision of such a press which is responsive to positioning of a wire in the ferrule to initiate crimping and which ejects a crimped terminal from the tape; and the provision of such press which is safe and reliable in use, has long service life, and is simple and economical to manufacture. Other objects and features of the present invention will be in part apparent and in part pointed out hereinafter in the specification and claims annexed thereto.

Briefly, the press of the present invention includes die members reciprocally movable between an open position and a crimping position and through a clamping position. Drive means are provided for moving the die members between their open and crimping positions while tape feeding means advance the tape as the die members move from their crimping position. Spring means are provided to move the die members to their clamping position subsequent to their reaching their open position.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
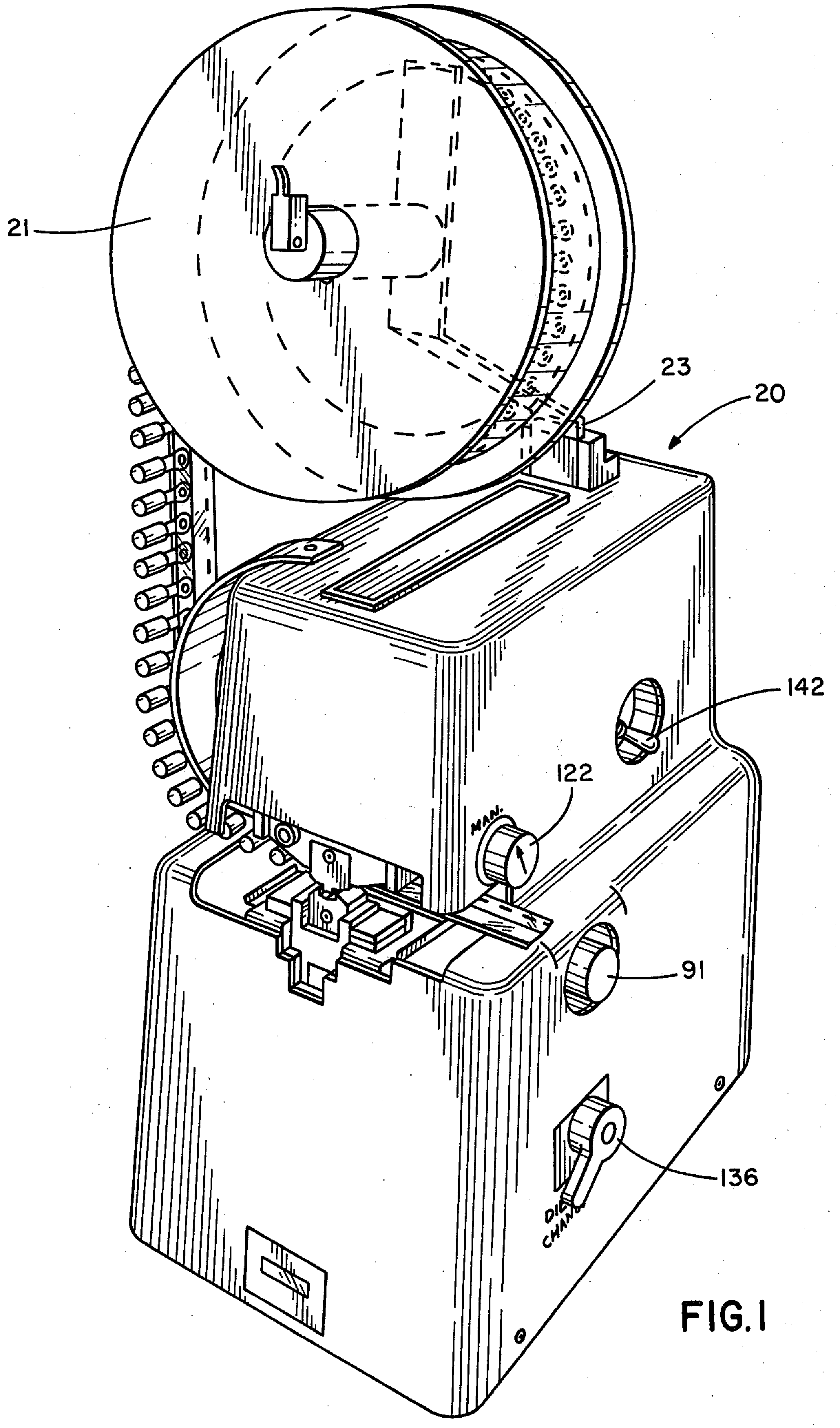
FIG. 1 is a perspective of a tape feed portable crimping press of the present invention shown with its housing, and terminal reel support installed.
Figure 2:
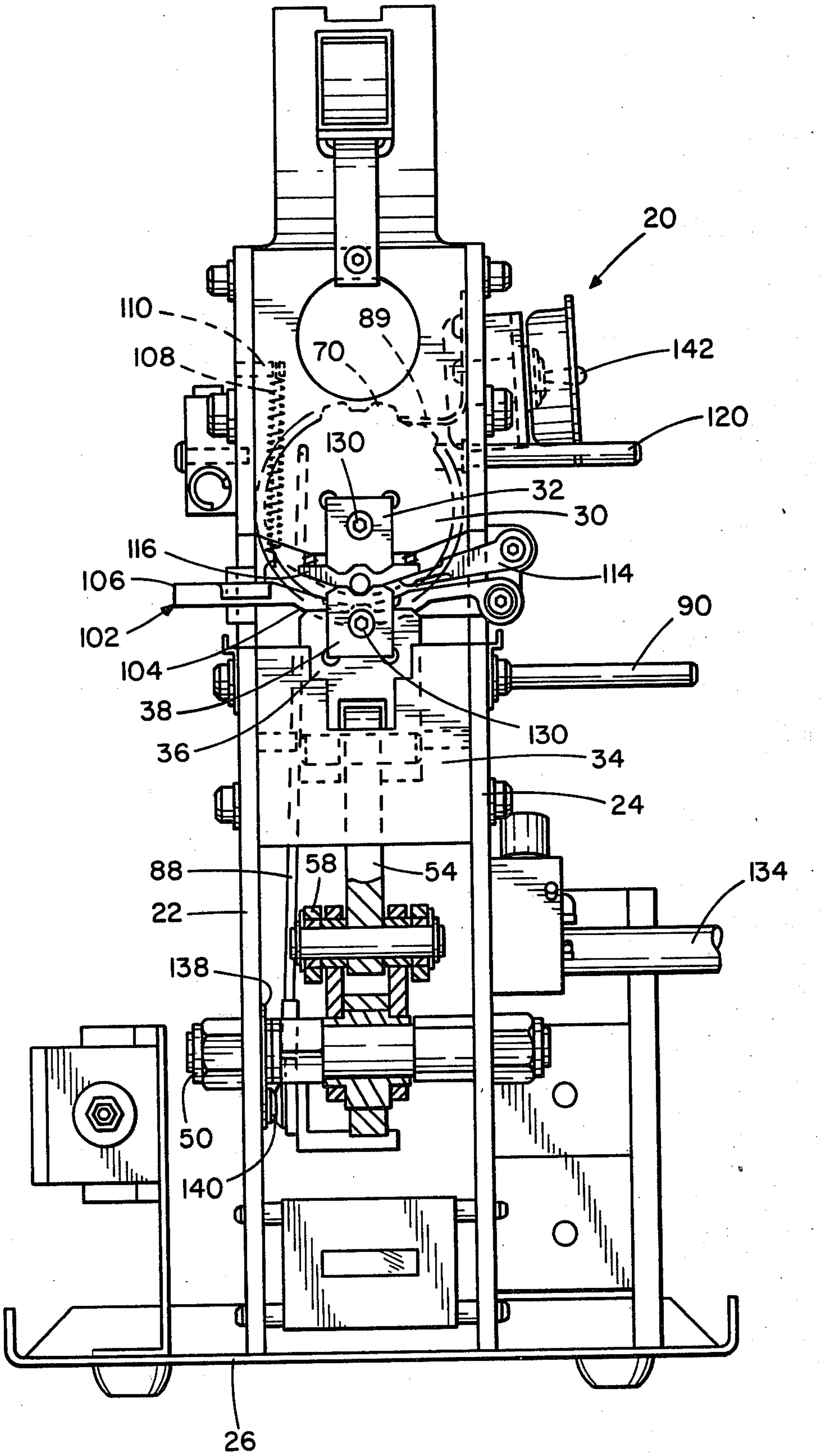
FIG. 2 is a front elevational view of the press of FIG. 1 with the housing, support and other components removed showing the upper and lower crimping die members.
Figure 3:
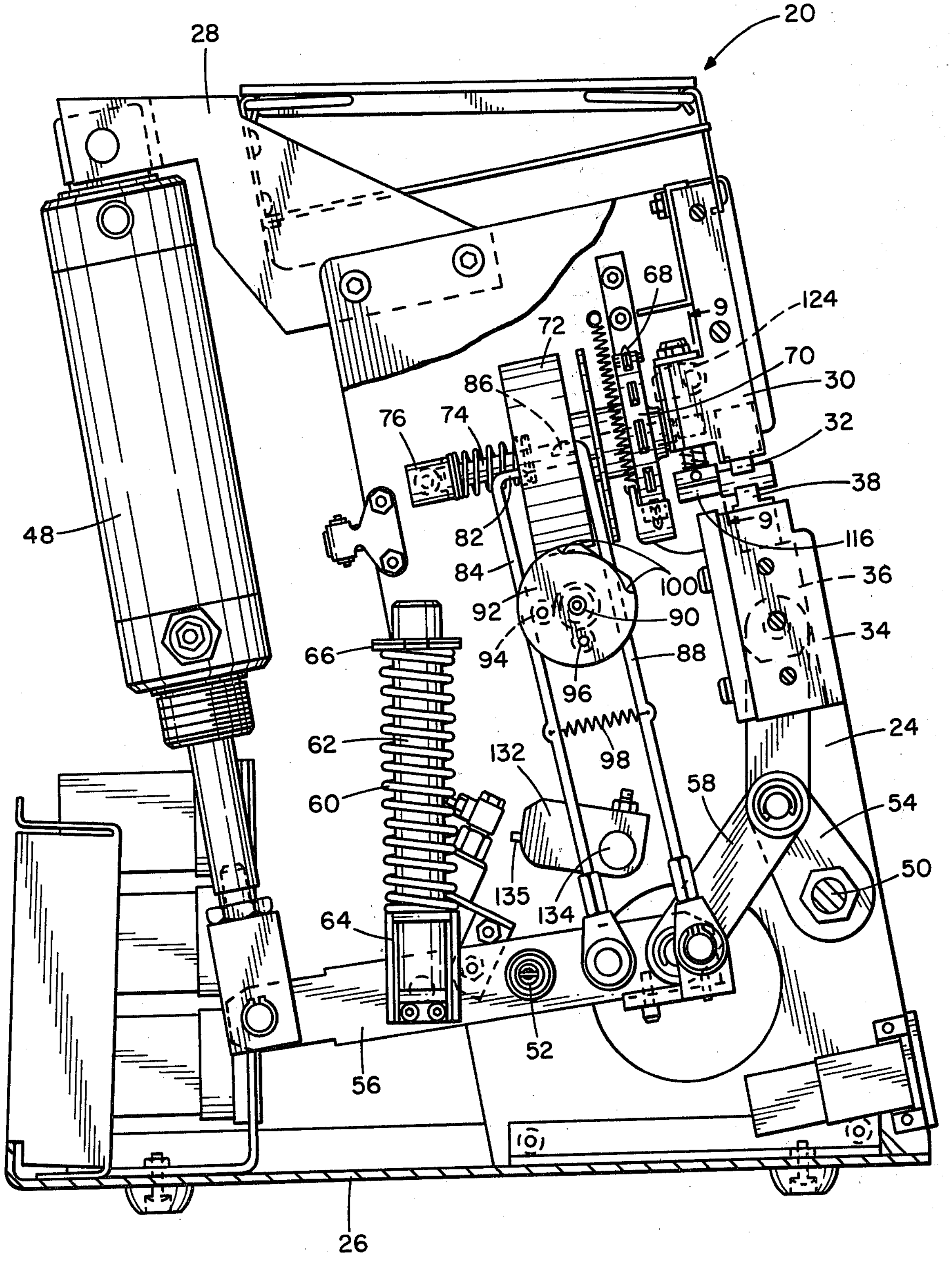
FIG. 3 is a side elevational view of the press of FIG. 2 which certain components removed disclosing a drive assembly for reciprocating the lower die member and a tape feed assembly for advancing the tape.

Referring now to the drawings, a portable, pneumatically operated crimping press for crimping the ferrules of terminals carried by tape about the stripped ends of insulated wires is generally indicated by reference character 20 in FIGS. 1, 2 and 3. In the interests of brevity, pneumatic limit switches, control valves . . . etc. are best shown with respect to the schematic control circuit diagram of FIG. 13 because the disposition of such pneumatic elements with respect to the mechanical components of press 20 will be readily apparent to one of skill in the art.

Press 20 includes a pair of load bearing side walls 22 and 24 extending from a base plate 26 and joined at their upper ends by a cylinder head support 28. Also interconnecting side walls 22 and 24 is an upper die member holder 30 to which is affixed stationary upper die member 32, and a guide block 34 for guiding reciprocal movement of a lower die holder 36, which carries lower die member 38, with respect to upper die member 32.

Figure 7:
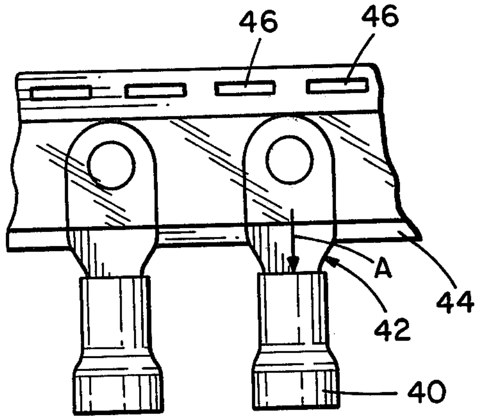
FIGS. 7 and 8, respectively, disclose tapes for use with the press of the present invention carrying larger terminals on longer centers and smaller terminals on closer centers, respectively.
Figure 8:
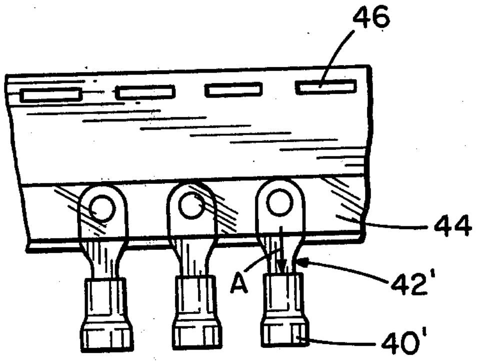

Die members 32 and 38 each have crimping faces which cooperate to deform the ferrule 40 of a terminal 42. As best shown in FIGS. 7 and 8, terminals 42 are carried by a tape 44 having regularly spaced drive apertures 36 along one margin thereof. Extending from the ferrule of each terminal is a connection component such as a ring, fork, or blade. A strip of, preferably, plastic material is adhesively bonded to the tape and with the tape forms pockets for receiving the connection component to firmly hold the terminals on the tape with the ferrules extending laterally from the tape. A force in the direction of arrow A in the axial direction of a ferrule will push the terminal from the tape. The tape is preferably carried on a reel 21 held by a support 23 attached to the top of press 20.

Figure 4:
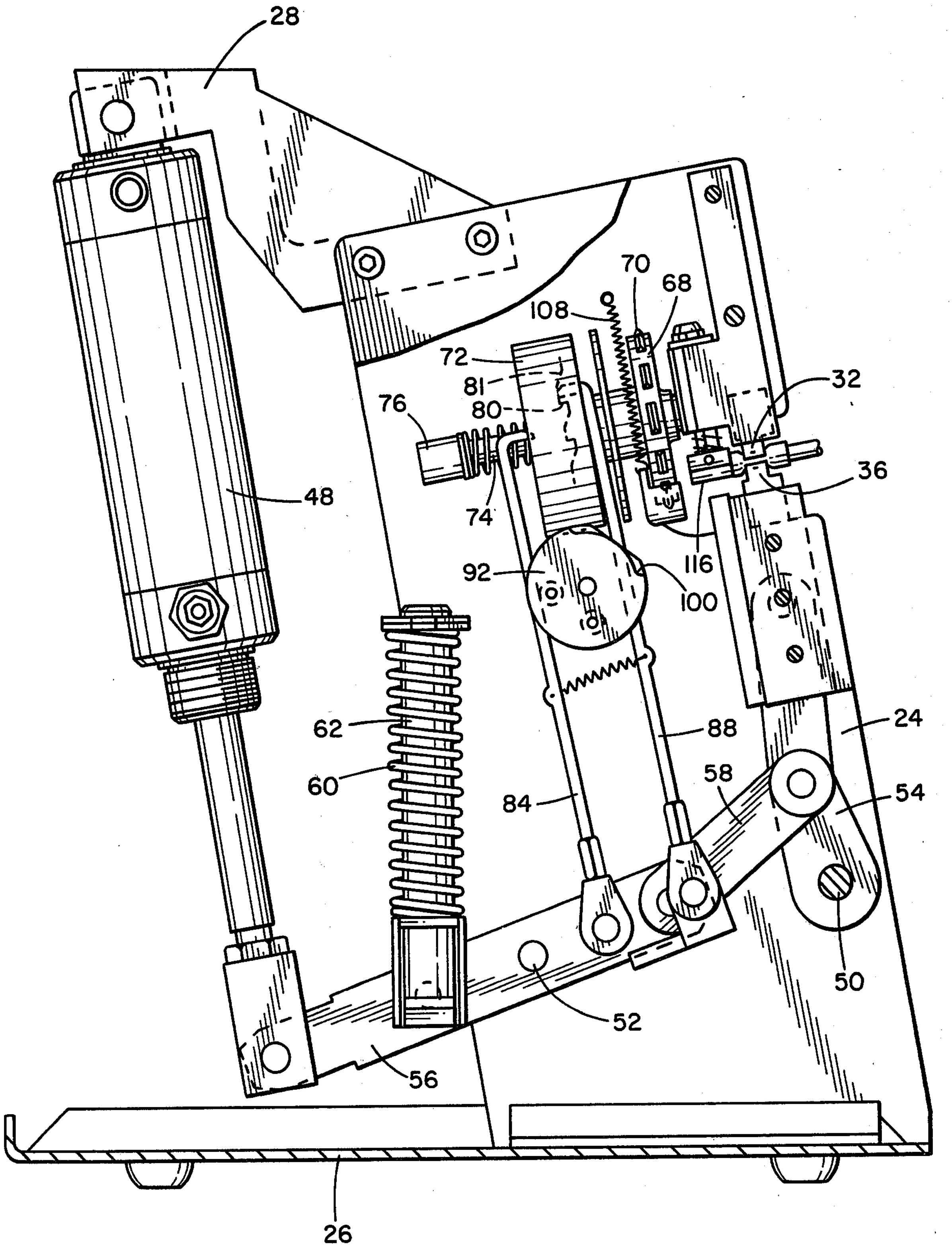
FIGS. 4, 5 and 6, respectively, illustrate the positions of the components of the drive assembly when the lower die member is in its crimping, open and clamping positions, respectively.
Figure 5:
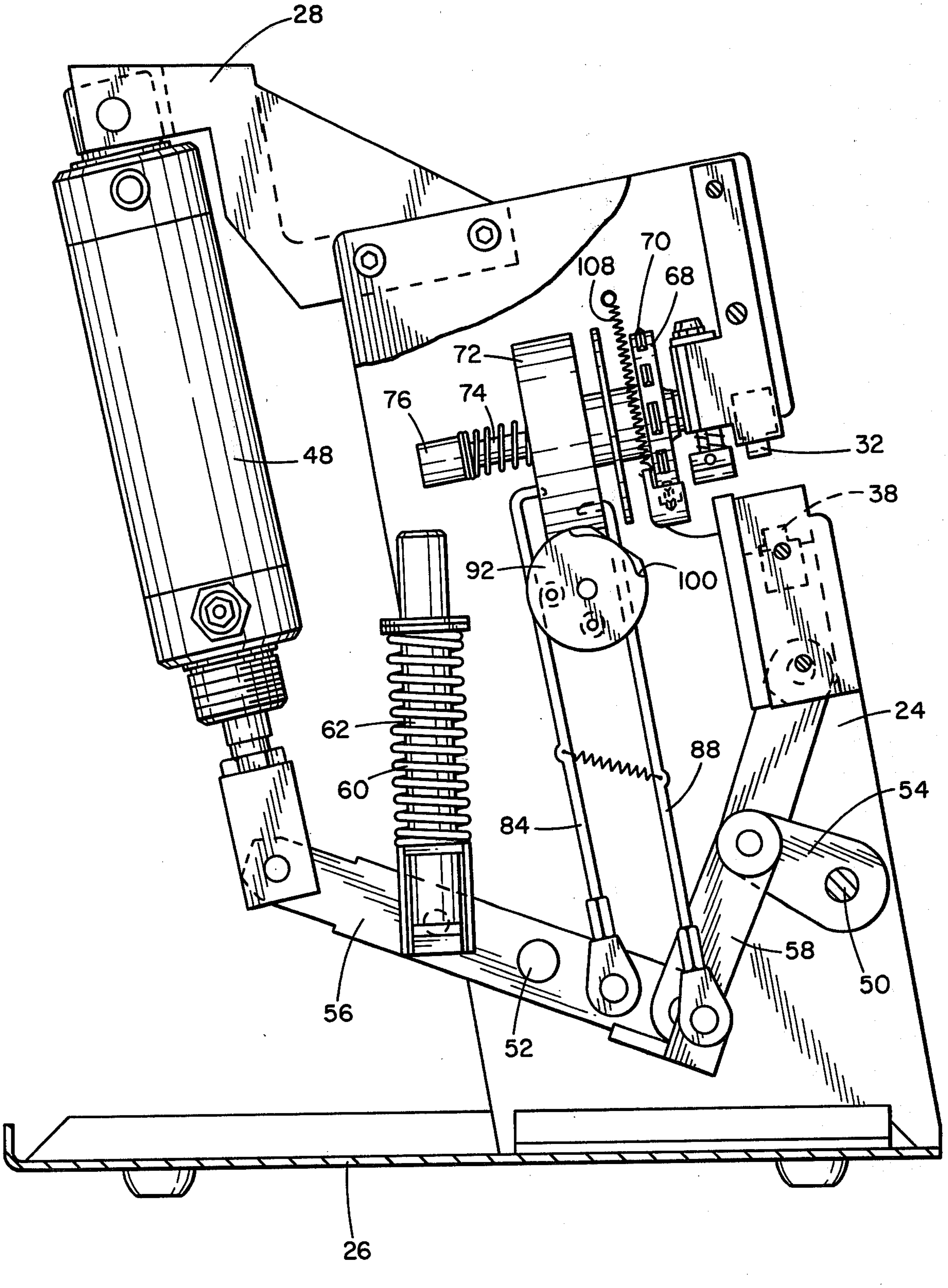
Figure 6:
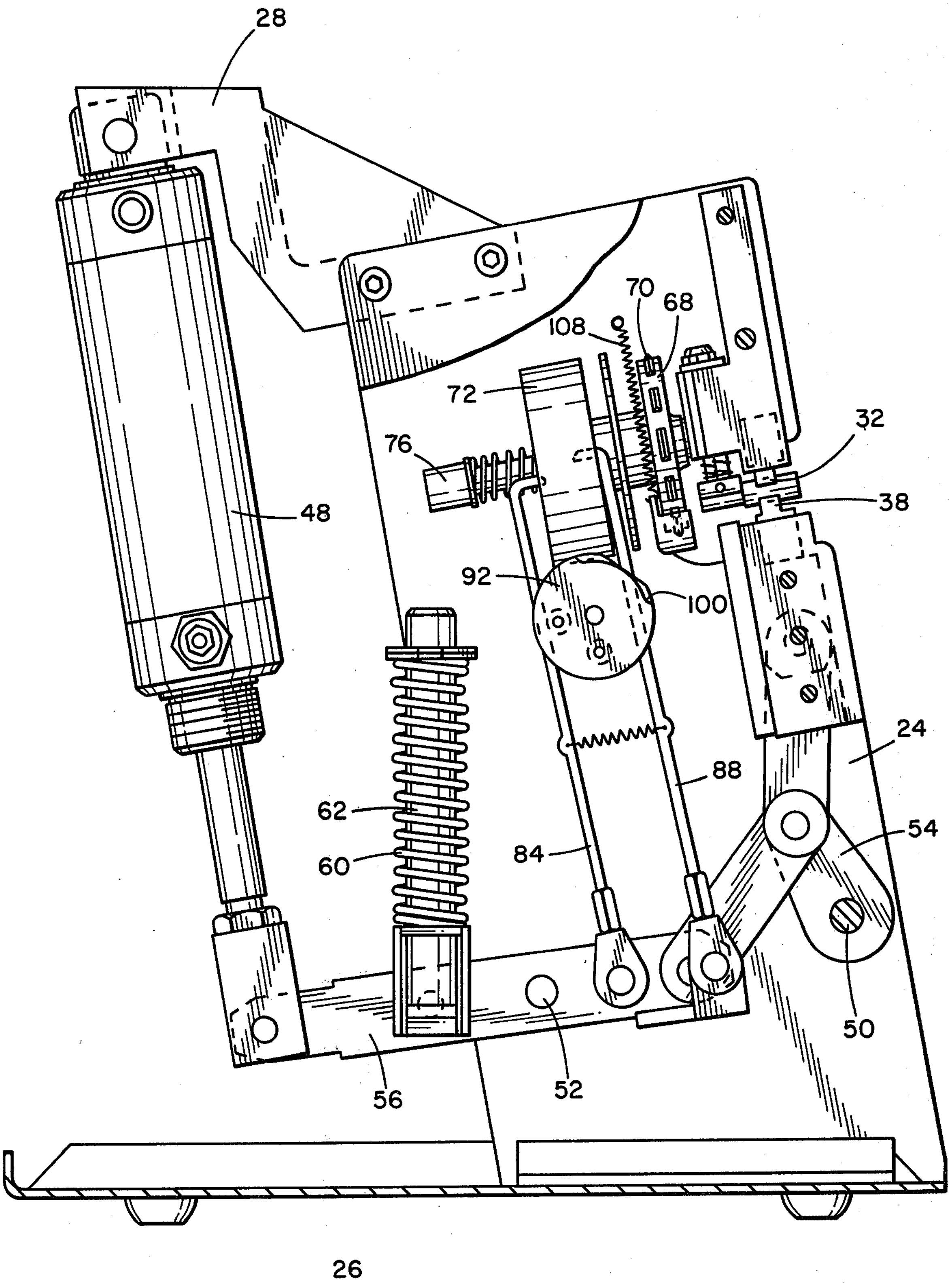

The die members are relatively moveable between a crimping position, depicted in FIG. 4, and a fully open position, illustrated in FIG. 5, and through a clamping position wherein a ferrule 40 is concurrently engaged and firmly held by the die members but not crimped as shown in FIG. 6. Press 20 further comprises drive means for selectively moving the die members between their open and crimping positions, tape feeding means for advancing the ferrule of the next upstream between the die members in response to movement of the die members from their crimping position to their open position, and spring means responsive to the die members reaching their open position to move them to their clamping position.

More specifically, the drive means (best shown in FIG. 3) includes a single air cylinder 48 the head of which is pivotally connected to support 28 and the rod of which is pivotally connected to a linkage connected to lower die holder 36 and supported between side walls 22, 24 by a pair of bearings 50 and 52. The linkage includes a knee toggle linkage subassembly 54 the respective ends of which are pivotally connected to lower die holder 36 and bearings 50, a drive link subassembly 56 pivotable on bearings 52 and one end of which is connected to the rod of cylinder 48, and an intermediate link subassembly 58 connecting the other end of the drive link subassembly to the knee of the knee toggle linkage subassembly. The spring means comprises a coil compression spring 60 disposed about an elongate core 62 an enlarged end 64 of which is attached to drive link subassembly 56 intermediate the cylinder rod and bearing 52 with the remaining end of the core captively, slidably held in a cap 66 which is pivotally retained between side walls 22 and 24.

Figure 12:
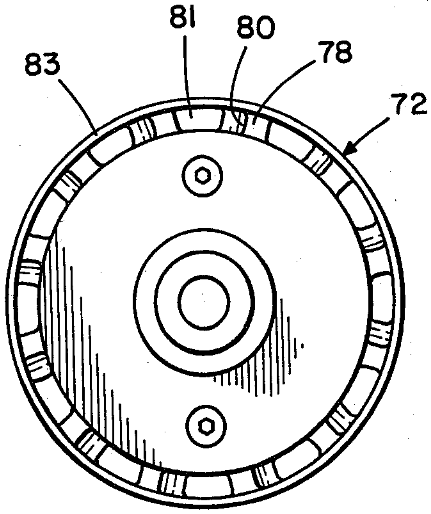
FIG. 12 shows a component of the tape feed assembly.

The tape feeding means includes a sprocket wheel 68, having a plurality of teeth 70 regularly spaced about its periphery for reception in apertures 46 of tape 44. The tape feeding means further comprises an index ring 72 mounted on a common shaft 74 with wheel 68 and with the ends of shaft 74 supported for rotation by bearings one of which is carried by upper die block holder 30 and the other of which is held by a bracket 76 attached to and disposed between side walls 22 and 24. FIG. 12 illustrates the side of index ring 72 facing away from sprocket wheel 68. Adjacent its periphery are regularly spaced recessed index teeth 78 each having an abutment surface 80 for engagement with the hook portion 82 of an index rod 84 pivotally attached to drive link subassembly 56. Disposed between an abutment surface 80 and the next tooth 78 is a ramp surface 81 for moving the index rod outwardly as the rod is moved by the linkage enabling the rod to be in position to engage another tooth 78. Index ring 72 also includes a peripheral rim 83 extending laterally beyond the teeth to guide hook portion 82 in curvilinear movement in alignment with the teeth. The side of index ring 72 facing sprocket wheel 68 is similar to that just described except its teeth have a greater pitch and are engageable with the hook portion 86 of an index rod 88. Referring to FIG. 2, a flat spring 89 attached to side wall 24 abuts the sprocket wheel teeth to prevent reverse movement of the tape when the rod of cylinder 48 extends.

Index rods 84 and 88 constitute length change means for selectively changing the length of tape advanced upon movement of die members 32 and 38 from their crimping position, shown in FIG. 4, to their open position, shown in FIG. 5. The pivotal connection of index rod 84 to drive link subassembly 56 is closer to bearing 52 than that of index rod 88 so that as the rod of cylinder 48 retracts, causing the dies to move to their open position, index rod 88 has greater travel than that of index rod 84. The travel of index rod 88 is analogous to the spacing between the larger terminals carried by the tape shown in FIG. 7 while the travel of index rod 84 is analogous the spacing between the smaller terminals carried by the tape shown in FIG. 8.

A hitch cam assembly is provided to enable the operator to select the desired tape advance length and includes a shaft 90 the end of which carries a selector knob 91. Mounted on shaft 90 is a plate 92 carrying a first cam pin 94 for deflecting index rod 84 out of operative engagement with index ring 72 and a second cam pin 96 which functions, when shaft 90 is rotated 90° counterclockwise from its position shown in FIG. 3, to deflect index rod 88 out of engagement with the index ring. A coil spring 98 interconnects the index rods to bias them inwardly. Plate 92 includes an arcuate cutout section extending approximately 90° about its periphery. The surfaces 100 of the plate defining the cutout section function as stops engageable with a post carried by sidewall 22. Spring means (not shown) are provided to bias shaft 90 to retain it in its selected position.

Press 20 also includes a tape saddle 102, see FIG. 2, for supporting the tape as it passes through the press and maintaining it in engagement with sprocket wheel 68. Saddle 102 is pivotally connected adjacent side wall 24, includes an arcuate portion 104 underlying sprocket wheel 68, and terminates in a finger piece 106 for use in deflecting the tape saddle away from the sprocket wheel to permit threading of the tape. A spring 108 affixed to a standard 110 biases the tape saddle to its support position.

Press 20 also comprises a pneumatic ejector cylinder 112 (See FIG. 13) for removing a terminal from the tape after the crimping operation has been completed and the tape advanced to move that terminal downstream of the crimping die members. The rod of cylinder 112 carries an ejector tip 114, as best shown in FIG. 2, for engaging the crimped ferrules to push the terminals from the tape.

Figure 9:
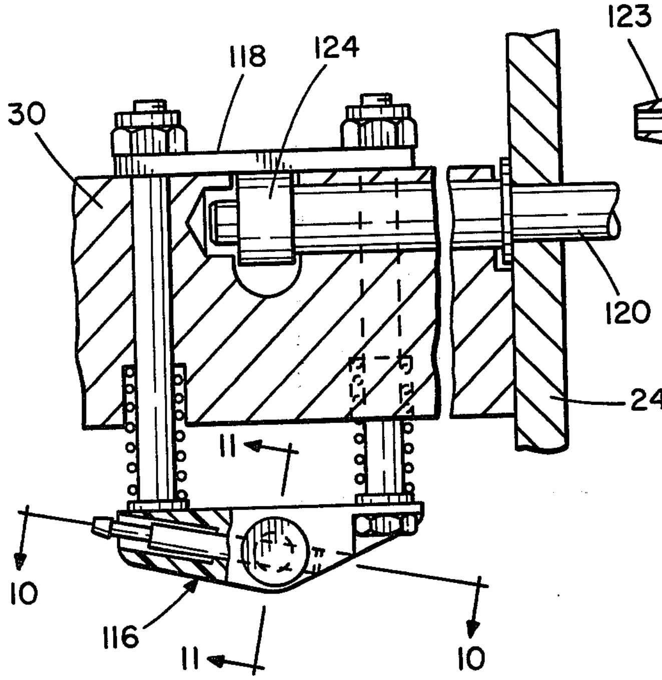
FIG. 9 is a view taken generally along line 9—9 of FIG. 3 with certain components removed showing a sensor for detecting the presence of a wire.

The press further comprises a pneumatic sensor 116, shown in FIGS. 9 and 3, responsive to insertion of a wire in a clamped ferrule to initiate movement of the die members to their crimping position. As will be pointed out more specifically with reference to the circuit diagram of FIG. 13, the use of the sensor is optional. It is mounted on a frame 118 slidably carried by upper die member holder 30 and is movable between an extended position wherein it is disposed in alignment with the clamped ferrule, and a retracted position in which it is disposed out of the way behind the upper die member. Positioning of the sensor is controlled by means of a shaft 120 one end of which carries a selector knob 122 and the other end of which carries a cam 124 engageable with a bridge portion of frame 118.

Figure 10:
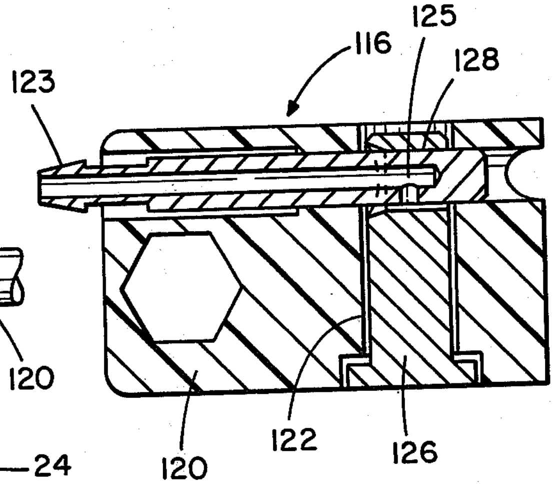
FIGS. 10 and 11 are, respectively, sectional views taken through the sensor taken generally along lines 10—10 and 11—11 of FIG. 9, respectively.
Figure 11:
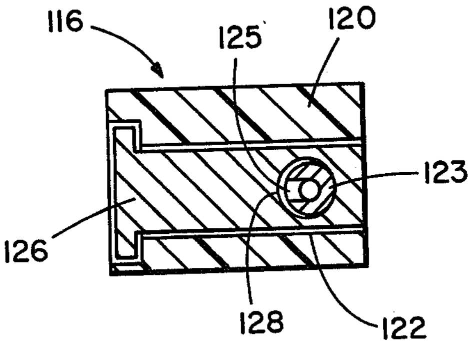

The construction of sensor 116, which is of the back pressure type, is best described with reference to FIGS. 10 and 11. Sensor 116 comprises a body 120 having a bore 122 therethrough having an enlarged end. A tube 123 extends through the body and into and past bore 122. A small opening 125 in the tube provides pressurized air to the bore. A cylindrical target 126 of slightly smaller diameter than bore 122 is disposed in the bore and has an enlarged head for engagement by the wire and further includes an aperture 128 receiving tube 123. Opening 125 extends generally toward the portion of target 126 to be engaged by the wire. Aperture 128 is defined by a surface of target 126 which is arcuate and, more specifically, cylindrical having a diameter slightly greater than that of tube 123. When a wire engages the target head, it moves to its retracted position wherein it seals the opening in the tube causing increased pressure in the tube which is connected to the sensing port of a valve V2 causing the valve to switch its position. When the wire is moved from the target, the pressurized air moves the target to its extended position allowing air to escape about the target and effecting the return of valve V2 to its pressure-biased position. The sensor is extremely sensitive, has little travel between its extended and retracted positions, and requires a very small force to be moved to its retracted position. This occurs because although air escapes from a single opening in tube 123, the surface of target 126 defining aperture 128 causes the escaping air to undergo annular flow which results in a generally balanced application of pressure on the surface defining aperture 128 when the target is in its extended position. Another advantage of sensor 116 is that, since tube 123 extends through target aperture 128, the target is captively held.

As shown in FIG. 2, die members 32 and 38 are each attached to their respective die holders by a single bolt 130. Both pneumatic and mechanical means are provided to retain the die members in their fully open position during die changing. More specifically, as shown in FIG. 3, a hold down block 132, for engaging drive link subassembly 56 when the rod of cylinder 48 is retracted, is mounted on a shaft 134 one end of which is connected to knob 136, shown in FIG. 1. As the operator starts to rotate block 132 from its position of FIG. 3, the control arm of a valve V8 (see FIG. 13) is actuated causing the rod of cylinder 48 to retract allowing block 132 to move to its lock out position. Block 132 carries a pin 135 for reception in an aperture in drive link subassembly 56.

Referring to FIG. 2, the portion of bearing 50 which supports the knee toggle linkage subassembly 54 is eccentric with respect to the portions of the bearing extending through sidewalls 22 and 24. One of those portions carries a clamping plate 138 having an arcuate aperture receiving a screw 140. This allows varying of the shutoff height of the lower die member by slightly rotating the bearing, as may be required for initial adjustment of die member spacing or to compensate for wear after press 20 has been in service for an extended time.

Figure 13:
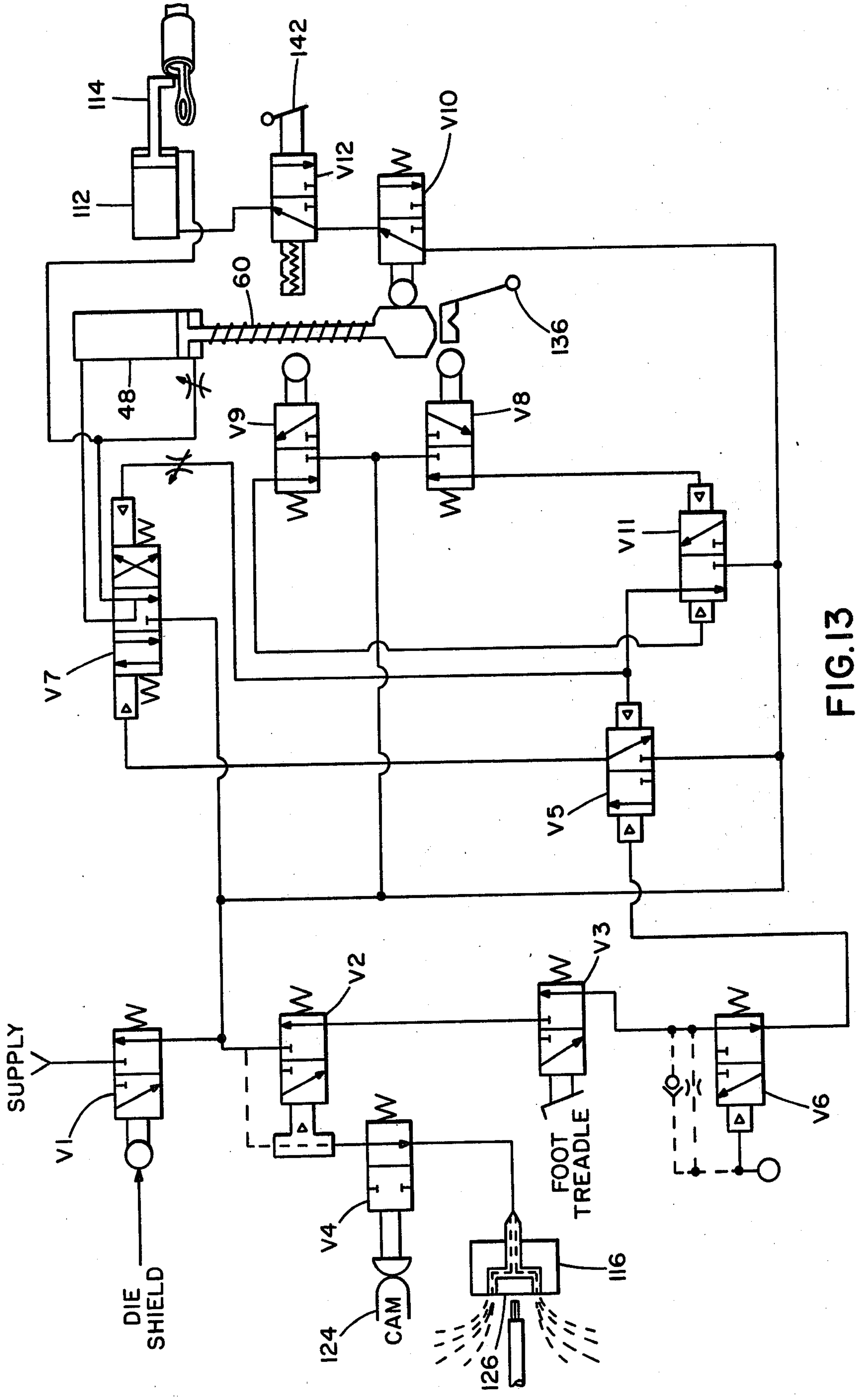
FIG. 13 is a schematic diagram of a pneumatic control circuit for the crimping press of the present invention.

Referring to FIG. 13, the apparatus of the present invention comprises a pneumatic control circuit including a three-way valve V1 responsive to positioning of a die shield (not shown) to supply pressurized air from a conventional factory source to a three-way, bleed-pressure piloted valve V2. This valve is of the type which supplies air to its sensing port and blocking of the sensing port causes the valve to supply source air to foot treadle controlled valve V3. If the sensing port of valve V2 is open, the valve V2 cuts off soucre air to valve V3. An example of such a valve is Model 2011 limit valve manufactured by Northeast Fluidic, Inc. The sensing port of valve V2 is connected to wire sensor 116 through a limit valve V4 which is switched to its closed position when cam 124 moves sensor 116 to its retracted position behind the upper die member 32.

The output of valve V3 is connected to a pilot of a cycle start valve V5 through a pulse valve V6. Valve V5 controls a pilot of a three position, four-way cylinder control valve V7 which in its biased or central position exhausts both sides of cylinder 48 permitting spring 60 to move the die members to their clamping position. When in its left position valve V7 causes cylinder 48 to extend its rod moving the die members to their crimping position, while in its right position the valve causes the rod of cylinder 48 to retract moving the die members to their open position.

The pneumatic circuit further comprises three-way limit valves V8, V9 and V10 which, respectively, have actuator arms positioned to switch the valves when the die members reach their crimping, open and clamping positions, respectively. A double pilot controlled three-way valve V11 is provided to switch valves V5 and V7 when the die members reach their crimping position and to permit cylinder valve V7 to return to its biased position in response to the die members reaching their open position.

When clamp position sensitive valve V10 is actuated, it supplies air to ejector cylinder 112 resulting in removal of the last-crimped terminal from the tape. If it is desirable for the crimped terminals to remain on the tape, the ejector cylinder can be disabled by the operator's actuation of a switch 142 which switches a valve V12 to cut off air to the ejector cylinder.

It should be noted that prior to die member changing, control knob 136 is actuated swithing valve V7 resulting in the rod of cylinder 48 moving to its retracted position.

Operation of press 20 is an follows: With the die members 32 and 38 in their clamping position, FIG. 6, holding a ferrule 40 and with sensor 116 in its extended position, insertion of the stripped end of a wire through the ferrule and into engagement with sensor target 126 causes the sensor 116 to block the sensing port of valve V2 resulting in air being supplied to the left pilot of valve V5 through valves V3 and V6. Valves V5 switches supplying air to the left pilot of valve V7 causing valve V7 to extend the rod of drive cylinder 48 moving the die members to their crimping position, FIG. 4. As the dies members close, the drive linkage moves hitch rods 84 and 88 generally upwardly; however, index ring 72 does not rotate because the end of flat spring 89 abuts a tooth 70 of sprocket wheel 68.

In response to the die members reaching their crimping position, limit valve V8 switches causing valve V11 to supply air to the right pilot of cylinder control valve V7 and to the right pilot of valve V5 switching it to cut off air to the left pilot of valve V7. Switching of valve V7 causes the rod of cylinder 48 to retract moving the die members to their open position (FIG. 5), and also causes ejector cylinder 112 to retract ejector tip 114. As the rod of cylinder 48 retracts, drive link subassembly 56 causes downward movement of index rods 84 and 88 the engaged one of which rotates index ring 72 resulting in the next upstream terminal being brought into registration with the die members.

In response to the die members reaching their open position, limit valve V9 cuts off air to the right pilot of cylinder control valve V7 by switcing valve V11. With the supply of air to both pilots of valve V7 interrupted, the valve returns to its center or biased position wherein both sides of the position of cylinder 48 are exhausted causing the die members to move to their clamping position under the influence of spring 60. This causes switching of limit valve V10 which supplies air to ejector cylinder 112 resulting in removal of the last-crimped terminal from tape 44.

Initial threading of the tape is effected by deflecting tape saddle 102 away from sprocket wheel 68, aligning the drive apertures 46 in the lead portion of tape 44 with sprocket wheel teeth 70, returning the tape saddle to its tape supporting position, retracting sensor 116 and actuating the foot treadle until the ferrule of the first terminal is clamped between the die members.

In view of the above, it will be seen that the several objects of the present invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A pneumatic sensor for connection to the sensor port of a bleed-pressure piloted valve and resonsive to engagement by an article the presence of which is to be detected to block air from escaping said sensor port, said sensor comprising:

a body having a bore;

a target slightly smaller than said bore disposed in said bore and having an aperture the axis of which extends transversely to that of said bore;

a tube connected to said sensing port and slightly smaller than said aperture extending through said body and into said aperture, said tube having an opening disposed in said aperture and extending generally toward the end of the target to be engaged by said article, said target being movable between an extended position and a retracted position in which said target blocks said opening, air pressure biasing said target to its extended position and the surface of said target defining said aperture being arcuate whereby, when said target is in its extended position, air escaping from said tube opening undergoes annular flow causing a pressure balance on the surface defining said target opening so that said target is movable from its extended position by very low force.

2. A sensor as set forth in claim 1 wherein said aperture extends through said target and said tube extends past said target.

3. A sensor as set forth in claim 1 wherein said target surface defining said aperture is cylindrical.

* * * * *